United States Patent [19]

Maehara et al.

[11] 4,335,736
[45] Jun. 22, 1982

[54] DOUBLE PIPING TYPE HYDRAULIC PRESSURE CONTROL DEVICE

[75] Inventors: Toshifumi Maehara, Hanzono; Tomohiro Fujita, Hanyu, both of Japan

[73] Assignee: Akebono Brake Industry Company Limited, Tokyo, Japan

[21] Appl. No.: 169,723

[22] Filed: Jul. 17, 1980

[30] Foreign Application Priority Data

| Jul. 31, 1979 | [JP] | Japan | 54-97572 |
| Sep. 18, 1979 | [JP] | Japan | 54-119545 |
| Dec. 17, 1979 | [JP] | Japan | 54-163945 |
| Dec. 17, 1979 | [JP] | Japan | 54-163946 |

[51] Int. Cl.³ .................................. G05D 11/03
[52] U.S. Cl. ...................... 137/87; 137/111;
137/118; 60/562; 188/349; 303/6 C
[58] Field of Search .............. 303/6 C; 188/349;
137/87, 111, 118; 60/562, 591

[56] References Cited

U.S. PATENT DOCUMENTS

| 3,410,090 | 11/1968 | Thirion | 60/591 |
| 3,969,000 | 7/1976 | Ohta et al. | 303/6 C |
| 3,975,060 | 8/1976 | Hirayama | 303/6 C |
| 3,977,731 | 8/1976 | Kasahara | 303/6 C |
| 4,053,186 | 10/1977 | Jakobi | 303/6 C |
| 4,071,281 | 1/1978 | Nogami | 303/6 C |
| 4,199,196 | 4/1980 | Teluo | 60/591 |
| 4,252,379 | 2/1981 | Falk | 303/6 C |

Primary Examiner—H. Jay Spiegel
Attorney, Agent, or Firm—Toren, McGeady & Stanger

[57] ABSTRACT

A double piping type hydraulic pressure control device in which hydraulic pressure control of a hydraulic pressure channel A is transmitted to another channel B in such a manner that the hydraulic pressure to be exerted on a balance piston for hydraulic pressure control is obtained solely from the hydraulic pressures of the two output chambers while two input hydraulic pressures are arranged to have nothing to do with the control action.

9 Claims, 7 Drawing Figures

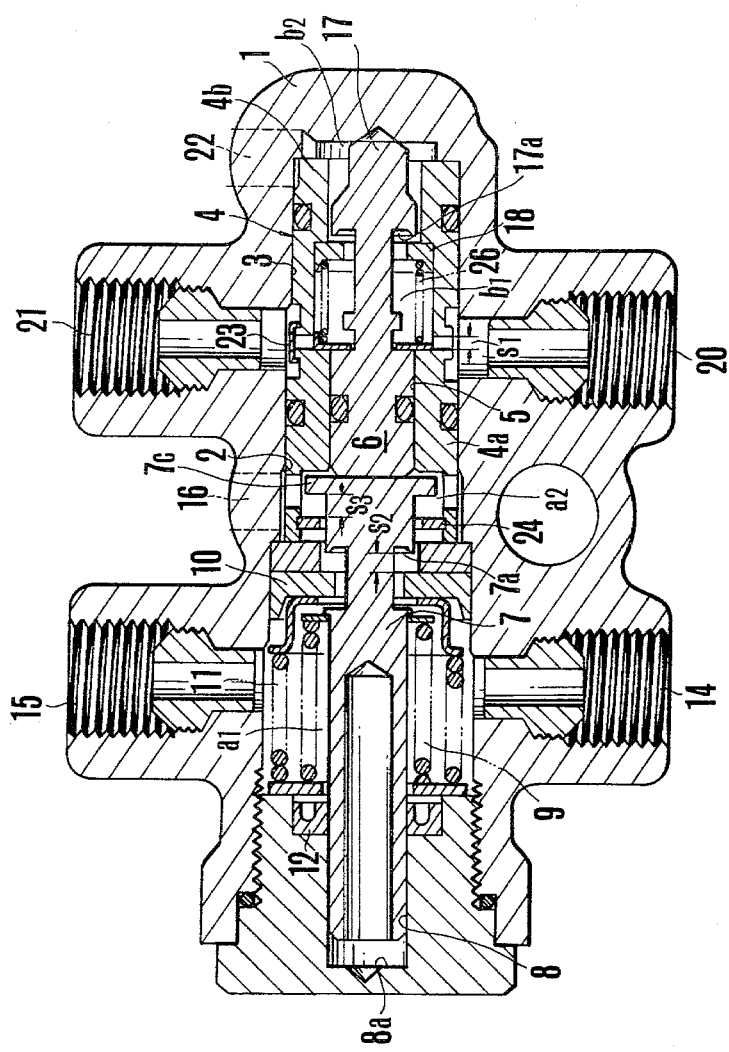

DOUBLE PIPING TYPE HYDRAULIC PRESSURE CONTROL DEVICE

BACKGROUND OF THE INVENTION

1. Field of the Invention

This invention relates to a hydraulic pressure control device of the type having a double piping arrangement.

2. Description of the Prior Art

Heretofore, there have been provided various kinds of double channel type hydraulic pressure control devices in which a hydraulic brake system for a vehicle is divided into two channels arranged in an X-shaped configuration relative to the front and rear wheels of the vehicle and, under such a condition, braking forces on the front and rear wheels are made suitable for friction between the road surface and these wheels by having smaller forces exerted on the rear wheels than the front wheels.

In the conventionally known device of this type, the hydraulic control over one of the two channels performed by a proportioning valve mechanism disposed in that channel is arranged to be transmitted to the other channel through a balance piston so that hydraulic pressure control over the latter channel is performed in association with the hydraulic pressure control performed for the former.

The present invention is directed to an improvement on the conventional device to obtain a better balanced state of the hydraulic pressure of the channels, because in the conventional device of this type, differential pressure between the output hydraulic pressure of one channel (hereinafter called channel A) which corresponds to hydraulic brake pressure on the rear wheel and that of the other channel (hereinafter called channel B) which corresponds to hydraulic brake pressure on the front wheels moves the balance piston in the axial direction thereof to close, for example, a ball valve employed as flow passage opening-and-closing valve mechanism of the channel B; and, after that, a passage which allows the input and output hydraulic chambers of the channel B to communicate with each other is arranged to be opened and closed in relation to the rise of the output hydraulic pressure on the side of the channel A. The ball valve, which opens or closes the passage allowing the input and output hydraulic chambers of the channel B to communicate with each other, is arranged to receive, at a part which corresponds to the sectional area of the above stated communication passage, a force that corresponds to a difference between the input hydraulic pressure and the output hydraulic pressure of the channel B. This force is proportional to the increase of the differential pressure between the input hydraulic pressure and the output hydraulic pressure. Therefore, this arrangement tends to cause an unbalance between the output hydraulic pressure of the channel A and that of the channel B.

SUMMARY OF THE INVENTION

It is therefore a general object of the present invention to provide a device in which, to eliminate the above stated shortcomings of the conventional device, the control action of a balance piston for balancing the hydraulic pressures of two output chambers are arranged to be obtained solely from the hydraulic pressures of the two output chambers while two input hydraulic pressures are arranged to have nothing to do with the control action.

The above and further objects, features and advantages of the present invention will become apparent from the following detailed description of embodiments thereof taken in connection with the accompanying drawings.

BRIEF DESCRIPTION OF THE DRAWINGS

FIG. 6 is another longitudinal sectional view showing a fourth embodiment of the invention.

DETAILED DESCRIPTION OF PREFERRED EMBODIMENTS

Figure 1:
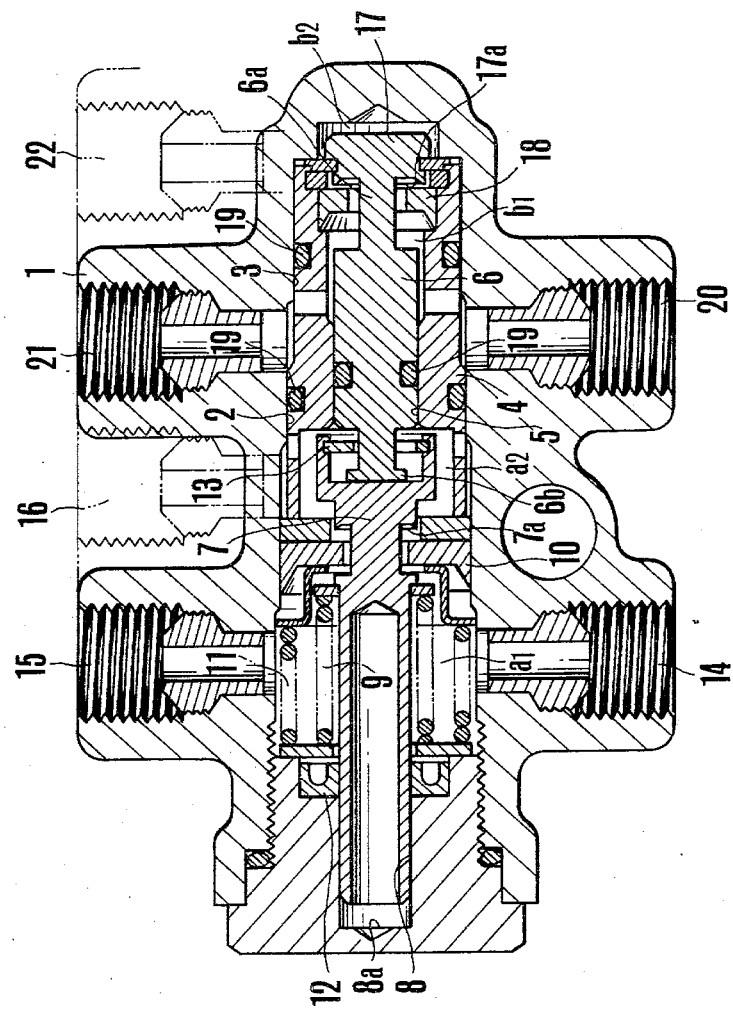
FIG. 1 is a longitudinal sectional view showing a hydraulic pressure control device as a first embodiment of the invention.

In FIG. 1 which shows a first embodiment of the invention, there are provided a valve body 1; a tubular cylinder member 4 which slidably engages a stepped cylinder 2 and 3 of the valve body 1; and a balance piston 6 which is slidably placed within a cylindrical space 5 formed by the inner cylindrical surface of the cylinder member 4. The balance piston 6 is arranged to divide the inside of the valve body 1 into two hydraulic pressure channels A and B and to transmit hydraulic pressure break point control performed in the channel A (on the left hand side as viewed on FIG. 1) to the channel B (on the right hand side as viewed on FIG. 1) through the following arrangement:

A proportioning valve mechanism disposed in the channel A comprises a control piston 7 which has a smaller diameter end thereof slidably inserted in a blind hole cylindrically shaped space 8 and a larger diameter end thereof confronts the balance piston 6; a control spring 9 pushes the control piston 7 in the direction of the larger diameter end of the control piston 7; and a valve seat member 10 is loosely placed onto an intermediate shaft part of the control piston 7 to divide the inside of a chamber of the valve mechanism into an input hydraulic liquid chamber a1 and an output hydraulic liquid chamber a2. Valve seat member 10 is arranged to engage the valve body part 7a in such a manner as to permit or block communication between the input and output liquid chambers a1 and a2. The embodiment also includes a spring 11 arranged to fix the valve seat 10 in position; a piston cup 12; and a stopper 13 which prevents the control piston 7 and the balance piston 6 from moving away from each other in excess of a certain predetermined extent and which is provided for the purpose of inhibiting the hydraulic pressure control action of the channel A when the channel B becomes devoid of hydraulic pressure.

There are further provided an input port 14 which connects the input liquid chamber a1 to the channel A of a master cylinder which is not shown; an output port 15 which connects the input liquid chamber a1 to a front wheel brake device (not shown); and an output port 16 which connects the output liquid chamber a2 to a rear wheel brake (not shown).

A valve mechanism is provided in the channel B and is arranged in the following manner: A large diameter head part 17 is formed at and extends from the end of a small diameter part 6a of the balance piston 6 remote from the control piston. Head part is disposed within an output liquid chamber b2. The large diameter head part 17 includes a valve body part 17a which has the same sealing sectional area as the sectional area of the inner cylinder 5 of the cylindrical space member 4. There is provided a valve seat member 18 which is secured to the cylinder member 4 and the smaller diameter part 6a of the balance piston 6 is loosely inserted in the valve seat member 18 and divides the inside of a chamber formed there into an input hydraulic liquid chamber b1 and an output hydraulic liquid chamber b2. Thus the valve seat 18 is arranged to allow or block communication between the input and output liquid chambers b1 and b2 by engaging the valve body part 17a.

Further, there are also provided a seal member 19; an input port 20 which connects the input liquid chamber b1 to the channel B of the master cylinder (not shown); an output port 21 which connects the input liquid chamber b1 to the front wheel brake device (not shown); and an output port 22 which connects the output liquid chamber b2 to the rear wheel brake device (not shown).

The device described above operates in the following manner: When a brake hydraulic pressure is transmitted from the master cylinder to the input liquid chambers a1 and b1 of the two channels A and B and then to the output liquid chambers a2 and b2, first there takes place hydraulic pressure break point control. In other words, the hydraulic pressure on the control piston 7, which is arranged to be balanced with the pushing spring force of the control spring 9, causes the control piston 7 to move from the illustrated condition in FIG. 1 to the left against the counteracting force of the control spring 9 and the valve body part 7a engages the valve seat 10. Accordingly, the input and output hydraulic pressure values Pa1 and Pa2 of the input and output liquid chambers a1 and a2 increase equally up to that point of time and, after that, the output hydraulic pressure value Pa2 increases slower than the input hydraulic pressure value Pa1 at a rate of $$\tan \theta = (A1-A2)/A1 \ (<1)$$

wherein $\theta$ represents the rising gradient of the output hydraulic pressure relative to the input hydraulic pressure. The rate which is determined by the ratio of the sealing sectional area A1 of the valve body part 7a to the sectional area A2 of the blind hole cylindrically shaped space 8 (A2<A1). Then, this hydraulic pressure control of the channel A is transmitted to the channel B through the balance piston 6.

In other words, the hydraulic pressure which is exerted on the balance piston 6 in the left direction as viewed on FIG. 1 is governed by the input hydraulic pressure Pb1 of the input liquid chamber b1 under the initial condition in which the input and output liquid chambers b1 and b2 of the channel B are communicating with each other. Under this condition, the input hydraulic pressure Pb1 is equal to the input hydraulic pressure Pa1 of the channel A and the hydraulic pressure on the balance piston 6 exerted from the channel A in the rightward direction as viewed on the drawing is governed by the output hydraulic pressure Pa2. Therefore, when a hydraulic pressure break point control takes place in the channel A to make the output hydraulic pressure Pa2 lower than the hydraulic pressure Pa1, the balance of the two forces exerted on the balance piston 6 is lost. This causes the balance piston 6 to be moved to the left as viewed on the drawing. Then, when the valve body part 17a engages the valve seat 18, the hydraulic pressure which is exerted on the balance piston on the channel B side becomes Pb2=Pa2 because the sectional area A3 of the cylindrical space 5 is set to be the same as the sealing sectional area of the valve body part 17a. Following this, the balance piston 6 which is arranged to be movable back and forth in the axial direction to balance the output hydraulic pressure Pa2 of the channel A and that of the channel B with each other serves to keep these output hydraulic pressure values Pa2 and Pb2 equal to each other. Besides, since the pair of the hydraulic pressure outputs Pa2 and Pb2 are arranged to be received by the same pressure receiving area A3 of the balance piston 6, the input hydraulic pressure Pb1 does not participate in an allowing or blocking action on the communication between the input and output liquid chambers b1 and b2 of the channel B. Therefore, the output hydraulic pressure Pb2 of the channel B is stably kept equal to the output hydraulic pressure Pa2 of the channel A irrespective of the differential pressure value between the input hydraulic pressure Pb1 and the output hydraulic pressure Pb2.

When the hydraulic system fails to operate on the side of the channel A, the hydraulic pressure of the channel B causes the control piston 7, the balance piston 6 and the cylinder member 4 to move together to the left as viewed on FIG. 1 until they come to a stop with the control piston 7 abutting against the bottom part 8a of the blind hole cylindrically shaped space 8. Under this stopped condition, there is produced a clearance between the valve body part 17a and the valve seat 18 so that the output hydraulic pressure Pb2 is not lowered. Conversely, when the hydraulic system fails on the side of the channel B, the balance piston 6 is moved to the right by the small hydraulic pressure of the channel A. The control piston 7 then tries to move against the force of the spring 9. However, the piston 7 is not allowed to move from the illustrated position because the sectional area A3 of the cylindrical space 5 is larger than the sectional area A2 of the cylinder 8 and the stopper 13 which is secured to the piston 7 engages with the stopper 6b of the balance piston 6, so that the output hydraulic pressure Pa2 will never be lowered.

As described in the foregoing, the double piping type hydraulic pressure control device of the present invention has a great advantage that the hydraulic pressure break point control can be stably performed over the interlocked channel (or the channel B) by a relatively simple improvement in the structural arrangement of the conventional device.

Figure 2:
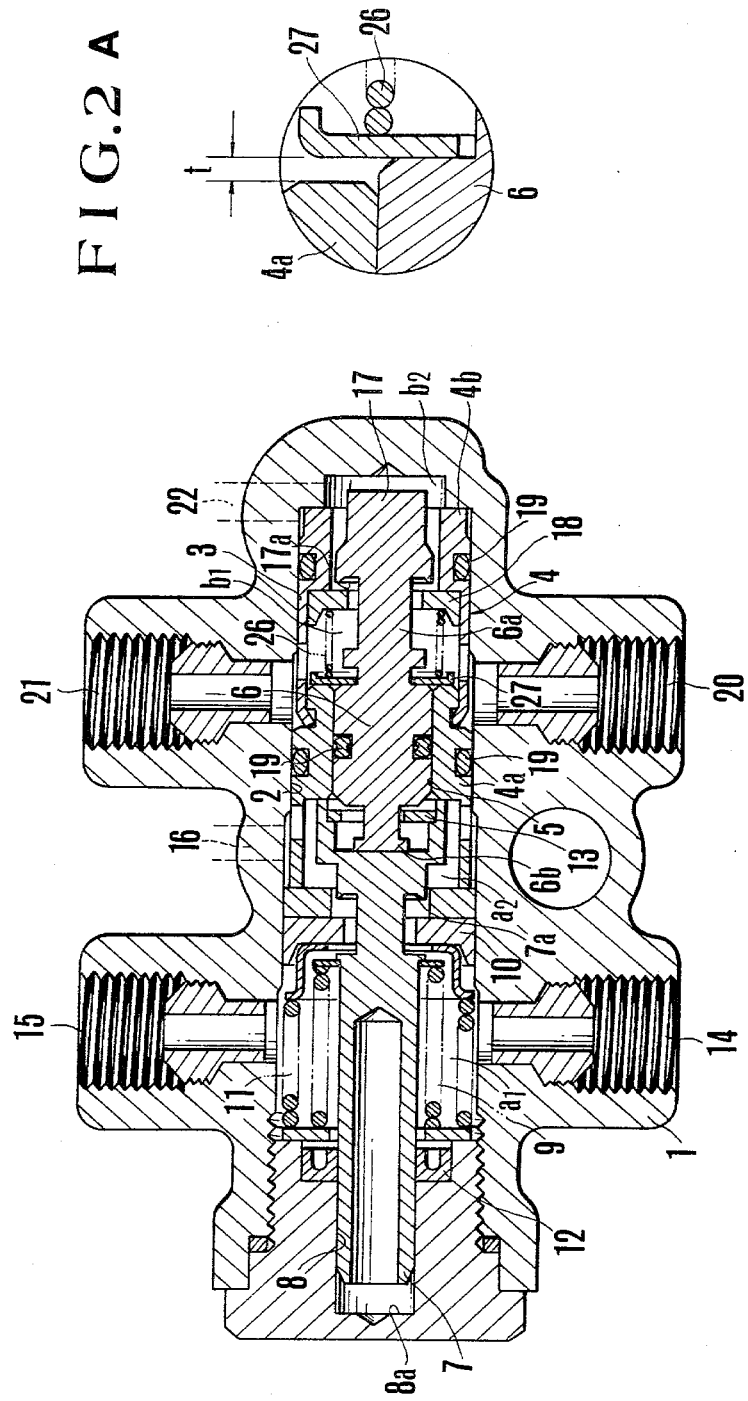
FIG. 2 is a longitudinal sectional view of a second embodiment of the invention and FIG. 2A an enlarged view showing an essential part of a modification of the second embodiment.

FIG. 2 shows a second embodiment of the invention with the same parts as those shown in FIG. 1 indicated by the same reference numerals and symbols. In the second embodiment, the tubular cylinder member 4 which is slidably engaged with the stepped cylinder 2 and 3 comprises a first part 4a having an inner cylindrical space 5 formed therein and a second part 4b which is connected to one end thereof. It is a feature of this embodiment that, in the channel B of the hydraulic pressure control device, there is provided a movement restricting mechanism which comprises a spring 26 and a spring seat 27 which restrict the movement of the balance piston 6 toward the channel B side under a normal condition.

Strictly speaking, the hydraulic pressure inputs Pa1 and Pb1 transmitted from a tandem master cylinder to the two channels A and B are not equal to each other. During brake application (when hydraulic pressure increases), one hydraulic pressure input is higher than the other input. Conversely, during brake release (when hydraulic pressure decreases), the latter hydraulic pressure input becomes higher than the former input. Besides, this difference in pressure is greater during brake release. In this particular embodiment, the former hydraulic pressure input coming from the master cylinder is connected to the channel B while the latter is connected to the channel A. The above stated pressure difference presents a problem that, during brake release, hydraulic pressure on the balance piston 6 is exerted in a greater degree toward the channel B (to the right as viewed on the drawing) to bias the balance piston 6 toward the channel B.

This problem means that, during the next brake application, the leftward movement of the control piston 7 takes place together with the balance piston 6 because of engagement of the two stoppers 6b and 13 and the sliding movement of the control piston 7 is thus affected by the sliding resistance of the balance piston. Further, while the hydraulic pressure break point control in the channel B is arranged to be effected only when the balance piston 6 is moved to the left, as viewed in the drawing, to a predetermined extent when the valve body part 7a of the control piston 7 abuts the valve seat 10, the free movement of the balance piston 6 is restricted and the hydraulic pressure output Pb2 of the channel B might be increased to an unnecessarily great extent because, in this instance, communication between the output liquid chamber a2 and the input liquid chamber a1 of the channel A is in a blocked condition.

In this embodiment, the above stated problem is solved by restricting the rightward movement of the balance piston 6, as viewed in the drawing, with the above stated spring 26 and the spring seat 27 and thus by preventing the balance piston 6 from unnecessarily moving toward the channel B during brake release. With the provision of this movement restricting mechanism, the moving extent of the balance piston 6 under a normal condition is stabilized and set to be from the illustrated stationary state to a state of having the valve body part 17a in contact with the valve seat 18, so that the adverse effect of the sliding resistance, etc. can be eliminated. Further, when the channel B fails to function, a great hydraulic force from the channel A causes the balance piston 6 to deflect the spring 26 and thus to restrict the movement of the control piston to the left as viewed in the drawing.

Further, as shown in FIG. 2A, it is also possible to provide a clearance between the first part 4a of the cylinder member 4 and the spring seat 27 in such a way as to have the balance piston 6 moved to the left by the spring 26, in response to the initial movement of the control piston 7, until the spring seat 27 comes into contact with the first part 4a.

With this arrangement, it is possible to have a great clearance between the valve body part 17a and the valve seat 18 in the initial stage so that, when a brake pedal is suddenly pushed down to cause a large amount of hydraulic liquid to flow, the large flow can be readily allowed to pass from the input liquid chamber b1 to the output liquid chamber b2.

Figure 3:
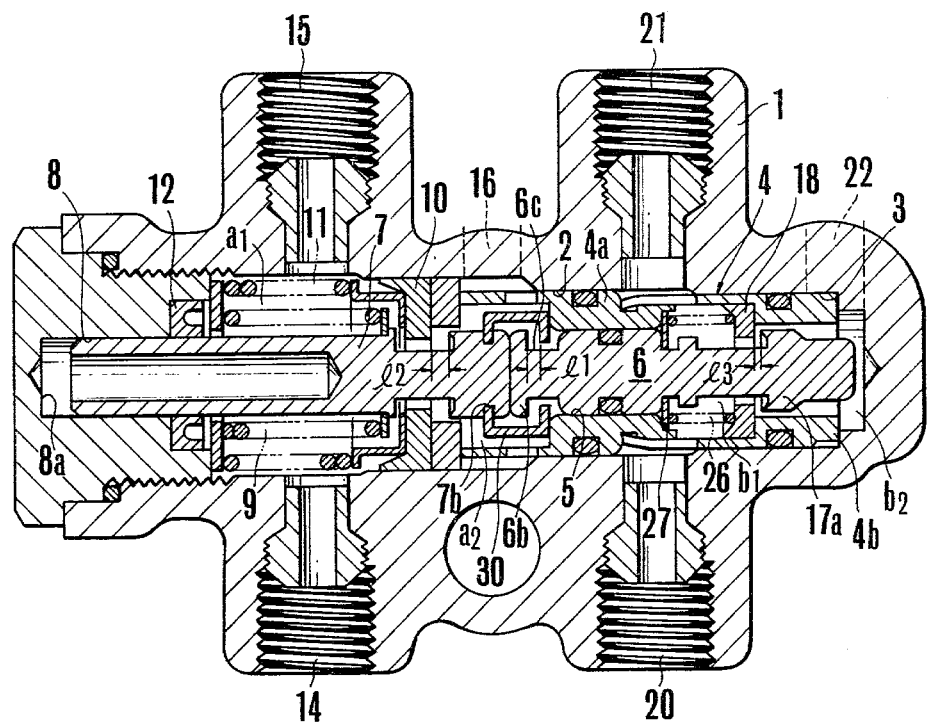
FIG. 3 is a longitudinal sectional view of a third embodiment.
Figure 4:
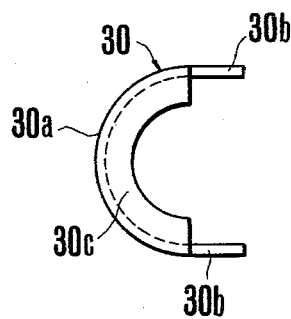
FIGS. 4 and 5 are enlarged views showing clips to be used in the third embodiment.
Figure 5:
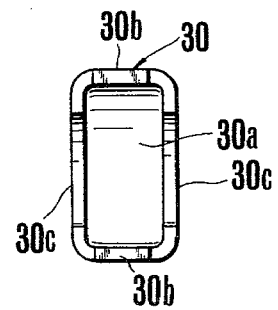

A third embodiment of the invention is as shown in FIGS. 3–5 wherein the same parts as those used in the preceding embodiments are indicated by the same reference numerals and symbols. It is a feature of the third embodiment that the control piston 7 and the balance piston 6 which respectively form the above stated valve mechanisms of the channels A and B are connected to each other through a fail-safe clip 30 which is placed in a circumferential groove 7b of the control piston 7. By this arrangement, these pistons 7 and 6 are restrained from moving away from each other in excess of a predetermined extent l1 and the control piston 7 is arranged to abut upon the cylinder member 4 through the above stated fail-safe clip 30. Referring to FIGS. 4 and 5, the fail-safe clip 30 comprises a half-cylindrical arcuate part 30a; curved arm parts 30b which extend from both ends of the arcuate part 30a in the tangential directions; and half-annular flange parts 30c. One of the flange parts 30c is fitted into a circumferential groove 7b formed in the fore end neck part of the control piston 7. The other flange part 30c of the fail-safe clip 30 is loosely placed in the circumferential groove 6c of a balance piston 6. The curved arm parts 30b are curved in such a way as to prevent the clip 30 from coming out of position in the radial direction.

With the double piping hydraulic pressure control device arranged as described, normally, under a stationary condition as represented by the drawing, the spring force of the control spring 9 causes the control piston 7 to abut on the cylinder member 4 through the fail-safe clip 30 and the balance piston 6 is biased by the control piston 7 to have the communication routes between the input and output liquid chambers a1 and a2 and between the input and output liquid chambers b1 and b2 open in the valve mechanisms of both the channels A and B.

When the hydraulic pressure is transmitted under this condition, the control piston 7 moves against the force of the control spring 9 to begin the hydraulic pressure control of the channel A and then the hydraulic control of the other channel B also takes place in association therewith. In this instance, the small spring force of the spring 11 allows the cylinder member 4 to be continuously in the stationary state. Further, assuming that the extent to which the control piston of the valve mechanism in the channel A moves until it comes to abut on the valve seat 10 is l2 and the extent to which the balance piston 6 moves until it comes to abut on the valve seat 18 is l3, it is necessary to arrange them to be l1 > (l2−l3) in relation to the extent of the loose fitting clearance l1 of the fail-safe clip 30.

When the channel B fails to operate, hydraulic pressure from the channel A acts to move the balance piston 6 to the right as viewed in the drawing and this restricts the movement of the control piston 7 toward the left valve seat 10 through the fail-safe clip 30. Therefore, the hydraulic control performed by the valve mechanism of the channel A is removed to keep the input and output hydraulic liquid chambers a1 and a2 continuously in a communicating state.

When the channel A fails to operate, the balance piston 6 and the cylinder member 4 move to the left and right as viewed on the drawing and, they are kept in the illustrated relation to the control piston 7, the control piston comes to a stop by abutting on the bottom 8a of the blind hole cylindrically shaped space 8. Accordingly, the valve body part 17a in the valve mechanism of the channel B is not allowed to abut on the valve seat 18 and the input and output hydraulic liquid chambers b1 and b2 are continuously kept in the communicating state.

FIG. 6 shows a fourth embodiment of the invention with the same parts indicated by the same reference numerals as the preceding examples of embodiment. In the fourth embodiment, the cylinder member 4 comprises the first part 4a and the second part 4b which are restrained from separating from each other in the axial direction of the cylinder by a clip 23 which is arranged along the outer circumferences of the closely confronting ends of the first and second parts 4a and 4b. These first and second parts 4a and 4b form a cylindrically shaped space with the spring 26 which is mentioned in the preceding embodiment examples arranged within the cylindrically shaped space to exert a small spring force to separate them from each other. With this arrangement of the spring 26, there is provided a clearance S1 between the first and second parts of the cylinder member 4.

The operation of this embodiment under a normal condition is the same as the operation of the preceding embodiment and, therefore, is omitted from description here.

When the channel A fails to operate, hydraulic pressure works in the leftward direction as viewed on the drawing to cause the balance piston 6 to move to the left while compressing the control spring 9 through the control piston 7 and comes to a stop with the rear end of the control piston 7 pressed against the bottom 8a of the blind hole cylindrically spaced shape 8. In this instance, the first part 4a of the cylinder member 4 is also moved to the left as viewed on the drawing until it comes into contact with the piston 7 by the hydraulic pressure while compressing holding spring 11 through valve seat 10. This causes the second part 4b to follow the movement of the first part 4a through the clip 23. Further, the balance piston 6 also moves to the left until it comes to abut on the piston 7. Therefore, the valve seat 18 is unable to abut on the valve body part 17a of the balance piston 6, so that the hydraulic pressure control cannot be performed on the channel B.

In the case of a failure of the channel B, the valve mechanism in the channel A tries to operate in the same manner as under a normal condition. However, the first part 4a of the cylinder member 4 is caused by the hydraulic pressure of the channel A to move to the right as viewed on the drawing against the force of the spring 26 until it comes to a stop by abutting on the second part 4b. Assuming that the extent to which the first part 4a moves in this instance, that is, the distance of the clearance normally exists between the first and second parts 4a and 4b is S1, the distance of a gap between the valve seat 10 and the valve body part 7a is S2 and the distance of a gap between a stopper 24 and a stopper 7c which is provided on the piston 7 is S3, they are arranged to be in a relation of S3−S1<S2. Such being the arrangement, the movement of the control piston 7 is restricted by the stopper 24 attached to the first part 4a and the stopper 7c of the piston 7, so that the valve seat part 7a cannot come to abut on the valve seat 10 and, eventually, the hydraulic control of the valve mechanism of the channel A is inhibited to have the output hydraulic pressure Pa2 raised up to the same degree of the pressure as the input hydraulic pressure Pa1 with a communicative condition retained between the two.

What is claimed is:

1. A double piping type hydraulic control device comprising:

means for forming a valve body having an axially extending passage therein with said axially extending passage including a first hydraulic pressure channel followed in the axial direction by a second hydraulic pressure channel, each of said first and second hydraulic pressure channels is divided into an input chamber and an output chamber;

an axially extending control piston located within said first hydraulic pressure channel and arranged to receive hydraulic pressure therein;

a first valve mechanism located within said first hydraulic pressure channel and performing pressure reducing control on the output hydraulic pressure of said output chamber of said first hydraulic pressure channel, said first valve mechanism including said control piston, a first valve seat (10) located within said first hydraulic pressure channel and located between said input chamber and said output chamber, and a control spring (9) biasing said control piston toward said second hydraulic pressure channel;

a balance piston located within said second hydraulic pressure channel and arranged to be exposed to the pressure within said output chambers of said first and second hydraulic pressure channels, said balance piston being axially displaceable said device including a stopping means for interconnecting the adjacent ends of said control piston and said balance piston, said stopping means arranged to limit to a predetermined extent the relative movement of said control piston and said balance piston away from one another; and a second valve mechanism located within said second hydraulic pressure channel, an inlet port in said valve body opening into said input chamber in said second hydraulic pressure channel, an outlet port in said valve body opening into said output chamber in said second hydraulic pressure channel, said second valve mechanism including said balance piston is arranged to selectively block communication between said input port and said output port of said second hydraulic pressure channel, said second valve mechanism includes a second valve seat member located within said second hydraulic pressure channel between said input and output chambers therein, and said balance piston includes a valve body part formed integrally with said balance piston and located within said output chamber of said second hydraulic pressure channel, said valve body part arranged to block communication between said input port and said output port by moving into engagement with said second valve seat member (18), said balance piston having a pressure receiving area at one end thereof exposed to the pressure within said output chamber of said first hydraulic pressure channel, said balance piston having another pressure receiving area on the opposite end thereof equal to said pressure receiving area on the one end of said balance piston and exposed to the pressure in said output chamber of said second hydraulic pressure channel when said second valve seat member and said valve body part are in engagement with one another.

2. A double piping type hydraulic device, as set forth in claim 1, the pressure receiving area of said control piston in said first hydraulic pressure channel is arranged to be less than the pressure receiving area of said balance piston located at the end of said balance piston closer to said control piston, so that abutting of said control piston upon said first valve seat is restrained to afford hydraulic pressure control over said first hydraulic pressure channel when said second hydraulic pressure channel fails to operate.

3. A double piping type hydraulic pressure control device, as set forth in claim 2, wherein said stopping means is secured to said control piston and is axially displaceably mounted on said balance piston with a clearance in the axial direction corresponding to the predetermined extent between said stopping means and said balance piston.

4. A double piping type hydraulic pressure control device according to claim 3 wherein said stopping means is caused to abut upon said cylinder member to determine the position of said control piston by a control spring which is arranged to push said control piston toward the first output chamber of said first hydraulic pressure channel.

5. A double piping type hydraulic pressure control device, as set forth in claim 1, wherein said valve body forms a cylindrically shaped space extending in the axial direction of said axial extending passage, a cylinder member slidably movable within said cylindrically shaped space, means for exerting a spring biasing force on said cylinder member, said cylinder member arranged to receive the hydraulic pressure of said first and second hydraulic pressure channels at both ends thereof, said balance piston slidably positioned within said cylinder member, and said second valve seat is secured to said cylinder member.

6. A double piping type hydraulic pressure control device according to claim 5 further including a spring which is arranged to push said balance piston toward said first output chamber.

7. A double piping type hydraulic pressure control device according to claim 6 wherein said spring is arranged to push said balance piston through a spring seat; and there is provided a clearance between said cylinder member and said spring seat.

8. A double piping type hydraulic pressure control device according to claim 6 wherein said cylinder member comprises a first part and a second part; said spring is arranged to urge said two parts to separate from each other; and the extent to which these parts are movable relative to each other is restricted to a predetermined value by a second stopping means.

9. A double piping type hydraulic pressure control device according to claim 9 wherein said balance piston is arranged to slide within said first part of said cylinder member; and the extent to which said control piston and said first part are movable away from each other is restricted to a predetermined value.

* * * * *